United States Patent
Davis et al.

(10) Patent No.: US 9,460,224 B2
(45) Date of Patent: Oct. 4, 2016

(54) SELECTION MAPPING BETWEEN FETCHED FILES AND SOURCE FILES

(75) Inventors: Joseph M. Davis, Issaquah, WA (US); Daniel P. Chartier, Seattle, WA (US); Jorge E. Gabuardi Gonzalez, Seattle, WA (US); Vishal R. Joshi, Redmond, WA (US); Michael J. Harder, Bellevue, WA (US); Michael Bach, Seattle, WA (US); Anh Thi-Phuong Phan, Renton, WA (US); Reshmi Mangalore, Redmond, WA (US); Jon E. Jung, Redmond, WA (US)

(73) Assignee: MICROSOFT TECHNOLOGY LICENSING LLC., Redmond, WA (US)

( * ) Notice: Subject to any disclaimer, the term of this patent is extended or adjusted under 35 U.S.C. 154(b) by 218 days.

(21) Appl. No.: 13/161,559

(22) Filed: Jun. 16, 2011

(65) Prior Publication Data

US 2012/0323940 A1    Dec. 20, 2012

(51) Int. Cl.
*G06F 7/00* (2006.01)
*G06F 17/30* (2006.01)
*G06F 9/44* (2006.01)

(52) U.S. Cl.
CPC ............ *G06F 17/3089* (2013.01); *G06F 8/75* (2013.01)

(58) Field of Classification Search
CPC ................... G06F 17/3089; G06F 17/30864; G06F 17/30873; G06F 17/30902; G06F 8/75
USPC .................................. 707/707, 756
See application file for complete search history.

(56) References Cited

U.S. PATENT DOCUMENTS

| | | | | |
|---|---|---|---|---|
| 5,740,430 A | * | 4/1998 | Rosenberg et al. | |
| 5,740,444 A | | 4/1998 | Frid-Nielsen | |
| 5,774,670 A | * | 6/1998 | Montulli | 709/227 |
| 5,964,836 A | * | 10/1999 | Rowe et al. | 709/221 |
| 6,023,764 A | * | 2/2000 | Curtis | 726/5 |
| 6,038,573 A | * | 3/2000 | Parks | 715/202 |
| 6,083,276 A | * | 7/2000 | Davidson et al. | 717/107 |

(Continued)

FOREIGN PATENT DOCUMENTS

| | | |
|---|---|---|
| CN | 101645009 A | 2/2010 |
| CN | 102270116 A | 12/2011 |

OTHER PUBLICATIONS

"Fetching an image and associated metadata with an AJAX request", Retrieved at <<http://stackoverflow.com/questions/939596/fetching-an-image-and-associated-metadata-with-an-ajax-request>>, Retrieved Date: Apr. 8, 2011, pp. 3.

(Continued)

*Primary Examiner* — Daniel Kuddus
(74) *Attorney, Agent, or Firm* — Kevin Sullivan; Kate Drakos; Micky Minhas (57) ABSTRACT

An element in a fetched file (a file received from the web server in response to an HTTP request) can be mapped to the source code that generated it and vice versa. When code is compiled at the web server, calls can be executed that emit HTML that includes metadata that maps a snippet of code back to a particular source file and to a particular location in the source file. The HTML can include injected symbols that specify that the information from a particular start position for a particular character length in the HTML comes from a particular start position to a particular end position in the source file.

20 Claims, 4 Drawing Sheets

(56) References Cited

U.S. PATENT DOCUMENTS

| | | | |
|---|---|---|---|
| 6,092,100 A * | 7/2000 | Berstis et al. | 709/203 |
| 6,175,832 B1 * | 1/2001 | Luzzi et al. | |
| 6,178,433 B1 * | 1/2001 | Nakamura et al. | 715/234 |
| 6,182,097 B1 * | 1/2001 | Hansen et al. | 715/234 |
| 6,205,432 B1 * | 3/2001 | Gabbard et al. | 705/14.73 |
| 6,247,020 B1 | 6/2001 | Minard | |
| 6,317,885 B1 * | 11/2001 | Fries | H04N 5/44543 348/E7.071 |
| 6,330,572 B1 * | 12/2001 | Sitka | G06F 17/30082 707/608 |
| 6,393,569 B1 * | 5/2002 | Orenshteyn | G06F 9/5055 709/203 |
| 6,502,239 B2 | 12/2002 | Zgarba et al. | |
| 6,609,246 B1 | 8/2003 | Guhr et al. | |
| 6,990,653 B1 | 1/2006 | Burd et al. | |
| 7,143,115 B2 | 11/2006 | Jones et al. | |
| 7,155,478 B2 * | 12/2006 | Ims | H04L 67/2819 709/203 |
| 7,191,405 B1 | 3/2007 | Jaramillo | |
| 7,246,134 B1 * | 7/2007 | Kitain et al. | |
| 7,316,003 B1 | 1/2008 | Dulepet et al. | |
| 7,325,191 B2 * | 1/2008 | Goddard | G06F 17/2211 715/210 |
| 7,395,312 B2 | 7/2008 | Kothari et al. | |
| 7,440,967 B2 * | 10/2008 | Chidlovskii | |
| 7,480,897 B2 | 1/2009 | Reinhardt et al. | |
| 7,503,035 B2 | 3/2009 | Zeidman | |
| 7,516,445 B2 | 4/2009 | Maennel et al. | |
| 7,543,268 B2 * | 6/2009 | Cherdron | G06F 8/20 717/100 |
| 7,661,064 B2 | 2/2010 | Cicerone | |
| 7,689,564 B2 | 3/2010 | Deen et al. | |
| 7,694,282 B2 | 4/2010 | Arkhipov et al. | |
| 7,779,161 B2 | 8/2010 | Buchs et al. | |
| 7,861,213 B2 | 12/2010 | Wang | |
| 7,890,919 B1 * | 2/2011 | Williams | G06F 8/36 717/100 |
| 7,941,755 B2 | 5/2011 | Siegrist et al. | |
| 8,032,597 B2 | 10/2011 | Khoo | |
| 8,281,284 B2 | 10/2012 | Na | |
| 8,356,277 B1 | 1/2013 | Bank et al. | |
| 8,434,014 B1 | 4/2013 | Jaramillo | |
| 8,499,237 B2 | 7/2013 | Buchs et al. | |
| 8,713,520 B2 | 4/2014 | Bank et al. | |
| 8,762,556 B2 | 6/2014 | Priyadarshan | |
| 2002/0023112 A1 | 2/2002 | Avital | |
| 2002/0026461 A1 * | 2/2002 | Kutay et al. | 707/523 |
| 2002/0073236 A1 * | 6/2002 | Helgeson | G06F 17/30569 709/246 |
| 2002/0170048 A1 | 11/2002 | Zgarba et al. | |
| 2004/0034846 A1 | 2/2004 | Ortal et al. | |
| 2005/0114381 A1 * | 5/2005 | Borthakur et al. | 707/102 |
| 2005/0198565 A1 | 9/2005 | McChrystal | |
| 2006/0039348 A1 | 2/2006 | Racz et al. | |
| 2006/0206865 A1 | 9/2006 | Reinhardt et al. | |
| 2007/0006155 A1 | 1/2007 | Maennel et al. | |
| 2007/0011713 A1 * | 1/2007 | Abramson et al. | 725/113 |
| 2008/0072136 A1 | 3/2008 | Lotenberg | |
| 2008/0098349 A1 | 4/2008 | Lin et al. | |
| 2008/0134142 A1 | 6/2008 | Nathan et al. | |
| 2008/0235660 A1 | 9/2008 | Chapman et al. | |
| 2008/0235671 A1 | 9/2008 | Kellogg et al. | |
| 2008/0244509 A1 * | 10/2008 | Buchs | G06F 8/36 717/106 |
| 2008/0270980 A1 | 10/2008 | Ahadian et al. | |
| 2008/0276183 A1 | 11/2008 | Siegrist et al. | |
| 2009/0031228 A1 | 1/2009 | Buchs et al. | |
| 2009/0094579 A1 | 4/2009 | Na | |
| 2009/0177959 A1 * | 7/2009 | Chakrabarti | G06F 17/2229 715/234 |
| 2009/0178031 A1 * | 7/2009 | Zhao | G06F 8/427 717/143 |
| 2009/0204926 A1 | 8/2009 | Cochrane | |
| 2010/0042641 A1 | 2/2010 | Kamalakantha et al. | |
| 2010/0162096 A1 | 6/2010 | Morrill et al. | |
| 2010/0192134 A1 | 7/2010 | Arkhipov et al. | |
| 2010/0293523 A1 | 11/2010 | Ahadian et al. | |
| 2011/0015917 A1 * | 1/2011 | Wang | G06F 9/455 703/23 |
| 2011/0023017 A1 | 1/2011 | Calvin | |
| 2012/0101929 A1 | 4/2012 | Howard | |
| 2014/0026115 A1 | 1/2014 | Bank et al. | |
| 2014/0096108 A1 | 4/2014 | Austin | |

OTHER PUBLICATIONS

Marte, et al., "OMS: Ontology Mapping Store", Retrieved at <<http://www.sti-innsbruck.at/fileadmin/documents/thesis/OMS-Ontology-Mapping-Store.pdf>>, Jan. 18, 2008, pp. 59.

Ashfield, et al., "System-independent file management and distribution services", Retrieved at <<http://ieeexplore.ieee.org/stamp/stamp.jsp?tp=&arnumber=5387567>>, IBM Systems Journal, vol. 28, No. 2, 1989, pp. 241-259.

Shannon, et al., "Deep Diffs: Visually Exploring the History of a Document", Retrieved at <<http://rossshannon.com/publications/softcopies/Shannon2010DeepDiffs.pdf>>, Proceedings of the International Conference on Advanced Visual Interfaces, AVI, May 26-28, 2010, pp. 4.

Ellis, et al., "Plagiarism Detection in Computer Code", Retrieved at <<http://www.rose-hulman.edu/class/csse/faculty-staff/csse-department/seniorTheses/Matt Ellis.pdf>>, Mar. 23, 2005, pp. 1-10.

Chevalier, et al., "Using Text Animated Transitions to Support Navigation in Document Histories", Retrieved at <<http://dmrussell.net/CHI2010/docs/p683.pdf>>, Conference on Human Factors in Computing Systems, Apr. 10-15, 2010, pp. 683-692.

"International Search Report", Mail Date: Feb. 1, 2013, Application No. PCT/US2012/040957, Filed date: Jun. 5, 2012, pp. 9.

"Supplementary Search Report Received for European Patent Application No. 12801264.8", Mailed Date: Nov. 3, 2014, 8 Pages.

Quigley, et al., "PHP and MySQL by Example", Pearson Education, Inc, Jan. 2009, 84 Pages.

Office Action Issued in China Patent Application No. 201280029539.9, Mailed Date: Oct. 10, 2015, 16 Pages.

Kerrigan, et al., "The Web Service Modeling Toolkit—An Integrated Development Environment for Semantic Web Services (System Description)", Jun. 2007, pp. 10, Available at: http://citeseerx.ist.psu.edu/viewdoc/summary?doi=10.1.1.98.3350.

Wuyts, et al., "Unanticipated Integration of Development Tools using the Classification Model", Jul. 7, 2003, pp. 17, Available at: http://citeseerx.ist.psu.edu/viewdoc/summary?doi=10.1.1.73.6180.

Non-Final Office Action Issued in U.S. Appl. No. 13/161,539, Mailed Date: Oct. 15, 2012, pp. 26.

Final Office Action Issued in U.S. Appl. No. 13/161,539, Mailed Date: Apr. 29, 2013, pp. 29.

Non-Final Office Action Issued in U.S. Appl. No. 13/161,539, Mailed Date: Jan. 30, 2014, pp. 25.

Final Office Action Issued in U.S. Appl. No. 13/161,539, Mailed Date: May 23, 2014, pp. 32.

Non-Final Office Action Issued in U.S. Appl. No. 13/161,539, Mailed Date: Apr. 5, 2016, pp. 7.

Search Report Issued in European Patent Application No. 12800005.6, Mailed Date: Dec. 3, 2014, 9 Pages.

USPTO Final Office Action, Mailed Date: Apr. 29, 2014, U.S. Appl. No. 13/161,529, Filed Date: Jun. 16, 2011, pp. 20.

USPTO Non-Final Office Action, Mailed Date: Dec. 23, 2014, U.S. Appl. No. 13/161,529, Filed Date: Jun. 16, 2011, pp. 15.

USPTO Final Office Action, Mailed Date: Jul. 16, 2015, U.S. Appl. No. 13/161,529, Filed Date: Jun. 16, 2011, pp. 17.

China First Office Action, Mailed Date: Sep. 1, 2015, Application No. 201080029384.9, Filed Date: Jun. 5, 2012, pp. 12.

European Search Report, Mailed Date: Dec. 3, 2014, Application No. 12800005.6, Filed Date: Jun. 12, 2012, pp. 9.

Non-Final Office Action, Mailed Date: Jan. 21, 2016, U.S. Appl. No. 13/161,529, pp. 20.

Non-Final Office Action, Mailed Date: Oct. 25, 2013, U.S. Appl. No. 13/161,529, pp. 15.

China Second Office Action, Mailed Date: Mar. 23, 2016, Application No. 201080029384.9, Filed Date: Jun. 5, 2012, pp. 17.

(56) References Cited

OTHER PUBLICATIONS

Japan First Office Action, Mailed Date: Nov. 13, 2015, Application No. 2014-515870, Filed Date: Jun. 5, 2012, pp. 5.
Office Action Issued in European Patent Application No. 12801264.8, Mailed Date: Aug. 1, 2016, 4 Pages.
Notice of Allowance Issued in U.S. Appl. 13/161,539, Mailed Date: Aug. 9, 2016, 9 Pages.
Office Action Issued in Chinese Patent Application No. 201280029539.9, Mailed Date: May 26, 2016, 14 Pages.

* cited by examiner

SELECTION MAPPING BETWEEN FETCHED FILES AND SOURCE FILES

CROSS-REFERENCE TO RELATED APPLICATIONS

The application is related in subject matter to patent application Ser. No. 13/161,529 entitled "LIVE BROWSER TOOLING IN AN INTEGRATED DEVELOPMENT ENVIRONMENT" and patent application Ser. No. 13/161,539 entitled "MAPPING SELECTIONS BETWEEN A BROWSER AND THE ORIGINAL FILE FETCHED FROM A WEB SERVER", filed herewith.

BACKGROUND

The World Wide Web has become a ubiquitous part of modern life. Correspondingly, web development is a burgeoning industry. Web development differs from traditional software development in several profound ways.

A complex web site can be made up of several different pages, whose content can be generated from many different files. Content can be divided up among the files in an infinite number of ways by a web developer who writes the code in the files that when processed by the web server and displayed in a browser results in the page a viewer sees. As the web server processes the files, it frequently generates additional content along the way. A few lines of code processed by the web server can be responsible for the generation of hundreds of lines of code in the final web page. When a client makes a request to a web server, the web server determines what files compose the response, assembles them into a single file, and then sends the response back to the client. After a browser has loaded the documents received from the web server into the browser, a scripting language that adds interactive features to the web page may add, delete, or modify contents in the document.

The way web processing works affects web development. For example, when a web developer wants to change part of a web site, the web developer has to know which of the many files at the web server associated with the web site is the file that has to be changed.

SUMMARY

An HTML file generated by a web server can be associated with metadata that enables content in the HTML file to be mapped back to the source that created the HTML content. A browser can send an HTTP request to a web server. Software on the web server can annotate the HTML response to the request to delimit location ranges in the HTML. Metadata can be added to the HTML file received by the client computer from the web server or can be received by the client computer in a separate file. The metadata can provide information that enables the delimited content in the HTML file received from the web server (i.e., a fetched file) by a development computer to be mapped back to the source files from which it originated. The server-side modules can be integrated with or plugged into a web framework so that the mapping information can be generated in response to an HTTP request from browser modules on the client.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

In web development, (and in particular in frameworks such as but not limited to Microsoft's ASP.NET), many different source files are combined to form the page a user can browse to on the Web. For example, a web site may have a number of pages listed in a menu bar on the web site such as "Home", "About", "Contact us" and so on. The code for the menu bar may exist in one source file, the "About" page in another source file and so on. When a user browses to the website, all the source files may come back to the user's browser as a single file such as for example, a file called "About.htm" or a file called "Contact.htm".

A developer who wants to change something on the web site has to know in what file the element that he wants to change is located. Frequently, finding the file to change becomes a non-trivial task because, for example, there are many different ways a web developer can choose to divide the content of the website and because information can be extracted from databases rather than be coded into the source. Thus a developer may be forced to manually execute "find in files" commands, look through code or rely on remembering where the element can be found.

In accordance with aspects of the subject matter disclosed herein, any snippet of code comprising a character, character position, location range or element in the fetched file (the file received from the web server in response to an HTTP request) can be mapped to the source code that originated it and vice versa. When the developer code is compiled (e.g., at the server), calls can be executed that emit HTML that includes metadata that maps a snippet of code in the HTML back to a particular source file and to a particular location in the source file. Instrumented calls can be inserted in interpreted source code files that when interpreted emit HTML that includes metadata that maps a snippet of code in the HTML back to a particular source file and to a particular location in the source file. Alternatively, the metadata can be sent separately, (e.g., in a file separate from the HTML file). The HTML can include annotations comprising injected symbols such as tokens, for example, that specify that the information from a particular start position to a particular end position in the HTML comes from a particular start position to a particular end position in the source file or additional metadata that provides this information can be provided.

The file that is fetched by the browser thus can include annotations and/or metadata that the browser does not need to display to the user. Therefore, before the browser gets the HTML file, the annotations and/or metadata can be removed from the file that the browser uses to display the website content. The file that the browser uses to derive the web page from is called the dynamic browser file. The metadata can be persisted to a data structure in memory. To achieve selection mapping between fetched and source files, a mapping table based on the metadata generated on the web server computer can be created. The mapping table can map portions of the file received by the client from the web server (the fetched file) in response to an HTTP request from the browser, to a source file. Each portion of the file can be identified by assigning an identifier to each section of the file.

Suppose, for example, a developer wants to change a telephone number in a contact page on a web site. The developer can open up an IDE, use a view command in the client-side mapping modules on the client computer to bring up the browser, open the browser, navigate to the contact page, and select the telephone number in the contact page. The source file for the contact page can be displayed adjacent to the browser display so that the source code that generates the browser page can be viewed simultaneously with the web page in the browser. The browser can scroll the view of the source code to the position in the source file corresponding to the selection in the browser. For example, the instrumented client side browser modules can take the user to the Contact page and to the exact position in the Contact file where the telephone number is hardcoded or where the command that accesses the telephone number in a file or database is found.

Mapping Between Fetched Files and Source Files

Figure 1:
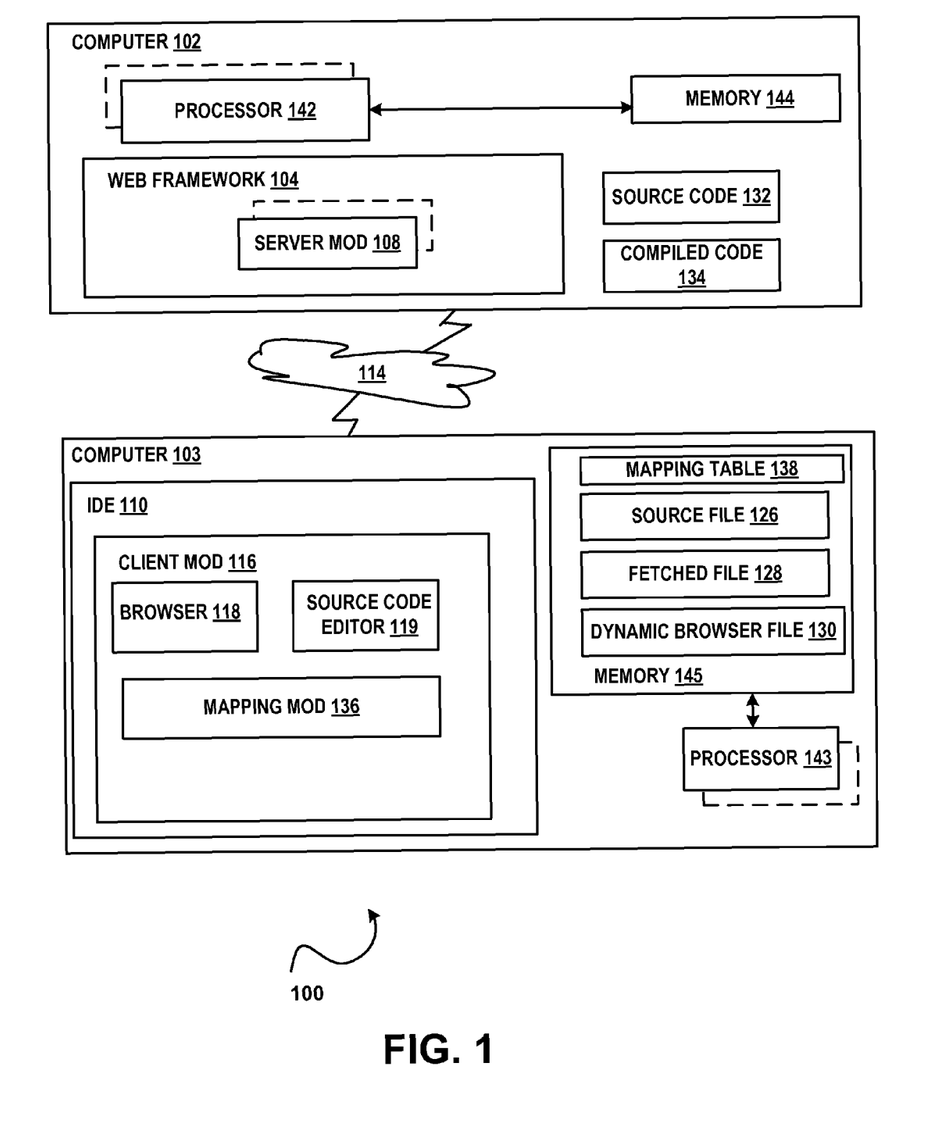
FIG. 1 illustrates an example of a system 100 that maps between fetched and source files in accordance with aspects of the subject matter disclosed herein.

FIG. 1 illustrates an example of a system 100 that maps between fetched files and source files in accordance with aspects of the subject matter disclosed herein. All or portions of system 100 may reside on one or more computers such as the computers described below with respect to FIG. 3. System 100 may execute in whole or in part on a software development computer such as the software development computer described with respect to FIG. 4. System 100 may execute within an IDE such as IDE 110. IDE 110 can be an IDE such as the one described with respect to FIG. 4 or can be any other IDE. All or portions of system 100 may be implemented as a plug-in or add-on.

System 100 may include one or more computers or computing devices such as a computer 102 comprising: one or more processors such as processor 142, etc., a memory such as memory 144, and one or more server-side modules such as server module 108. Server module 108 can provide server-side processing needed to map between fetched files and source files. System 100 may also include one or more computers or computing devices such as a computer 103 comprising: one or more processors such as processor 143, etc., a memory such as memory 145, and one or more client-side mapping modules such as client module(s) 116. Client module(s) 116 can map between fetched and source files as described more fully herein. Other components well known in the arts may also be included but are not here shown. It will be appreciated that one or more server-side mapping modules such as server module 108 can be loaded into memory 144 to cause one or more processors such as processor 142 to perform the actions attributed to the server module 108. It will be appreciated that one or more client-side mapping modules such as client module(s) 116 can be loaded into memory 145 to cause one or more processors such as processor 143 to perform the actions attributed to the one or more client module(s) 116.

Computer 102 can represent a web server computer that delivers web pages and other documents to browsers using the HTTP protocol. Computer 102 can include one or more of a web framework such web framework 104. Web framework 104 can be a web framework such as but not limited to ASP.NET, PHP, PERL, Ruby, etc. A server-side portion of a system that maps between fetched and source files, according to aspects of the subject matter disclosed herein, is represented in FIG. 1 by server module 108. Server module 108 can be a plug in or add in to web framework 104. Source code 132 and/or compiled code 134 can be received by the server module 108 and can be used to generate an HTML file that is sent from the server computer 102 to the client computer 103 in response to an HTTP request from a browser such as browser 118.

A server module 108 can generate an HTML file (the "fetched file") to be sent to a client computer such as client computer 103. The server module 108 can emit information concerning the source files from which sections of the HTML file are generated. Information concerning the source files can be returned to the client computer. For example, information can be returned by embedding it in the HTML file sent to the client or the information can be sent in a separate file. Whether or not the metadata is included in the HTML file sent to the client computer, is sent separately or is not sent at all can be controlled by web site configuration settings, HTTP headings information, query string information, form data and so on.

The server module 108 can generate metadata that associate positions in an annotated HTML file with sections of source code in source code files. For example, an XML table can be used to store both source and destination positions. Alternatively, tokens can be used to associate location ranges in an HTML file with sections of source code files and so on. In accordance with some aspects of the subject matter disclosed herein, a server module 108 can generate start and end tokens that together define a range of locations in the HTML file generated by the server computer 102 that come from a particular location in a particular source file. It will be appreciated that the format of the tokens can be any suitable format. For example, one format can be $startToken$ and $endToken$. The $startToken$ can be used to delimit a start position in the HTML file and the $endToken$ can be used to delimit an end position in the HTML file for the section of HTML code under consideration. Each start token/end token pair can be assigned a sequential number or other identifier to distinguish one pair of start and end tokens from another pair of start and end tokens.

After the web server is done generating the requested file, the context data can be generated. Any data structure can be used to expose the context information. One way of exposing the context data is an XML formatted data structure that can be used as a mapping table and includes data needed to associate sections in the HTML file with sections of the source. For example, a table of ranges in the source file that correspond to the range of locations in the HTML file delimited by start and end tokens can be included. In accordance with some aspects of the subject matter disclosed herein, the context information can be included at the end of the HTML file sent to the client computer. Each pair of start and end tokens can be identified by an identifier that identifies that particular pair of start and end tokens, (e.g., an identifier that is unique to that pair of start and end tokens) to enable mapping between locations in the HTML file and locations in a particular source file from which the HTML snippet was generated, by matching identifiers.

For example, for a 10-character range in a fetched file that starts at position 50, which is mapped to a 10-character range in a source file that starts at position 0, a selected position 58 in the fetched file, which falls within the 10-character range, can be mapped to the source file as follows: the fetched range's start position can be subtracted from the selected position, and the result can be added to the start position of the range in the source file. In this case, 58−50+0=8, where 8 is the selected position in the source file. The same operation can be performed for start and end positions of a selected range within the fetched file to find the start and end of the corresponding range in the source file. One source location range can map to multiple location ranges in the HTML file generated by the web server computer 102. One range in one source file can include ranges in another source file so that a single location in a fetched file can map to multiple source files. For example, a source file can include a command to include another source file at the current location.

Content in the HTML that is generated by the web server can be identical, character for character to the content in the source file. This type of content is called literal content. Literal content can be, for example, HTML. Content in the HTML that is generated by the web server can be different from content in the source file. This type of content is called nonliteral content. Nonliteral content can be code in the source file that is run to produce HTML in the HTML file generated by the web server. The metadata that is produced by the web server can include the following context information: an identifier that is used to map source to fetched files, a start position in the source file, an end position in the source file or alternatively, a length in the source file, the name or path for the source file (where the output originated from), an indicator that indicates whether the content is literal or nonliteral content, a start position in the fetched file, an end position in the fetched file or alternatively, a length in the fetched file. This information makes translation from fetched file to source file possible.

Computer 103 can represent a client computer that hosts a web browser (e.g., browser 118). Browser 118 can be any browser including but not limited to Mosaic, Microsoft's Internet Explorer®, Mozilla, Netscape, Firefox and so on. A web browser is a software application for retrieving, presenting, and traversing information resources on the World Wide Web. An information resource is identified by a Uniform Resource Identifier (URI) and may be a web page, image, video, or other piece of content. Computer 103 can represent a software development computer. Computer 103 can host an IDE 110 that includes one or more client-side modules such as client module(s) 116, etc. that maps between fetched and source files in accordance with aspects of the subject matter disclosed herein. The client module(s) 116, can include one or more of: a browser 118, and/or mapping module 136. System 100 can also include any or all of the following: a mapping table 138, one or more source files (represented in FIG. 1 by source file 126), a fetched file 128 and/or a dynamic browser file such as DOM 130. The Document Object Model (DOM) is a cross-platform, language-independent convention for representing and interacting with objects in HTML, XHTML and XML documents. DOM elements can be addressed and manipulated by programming languages including scripting languages such as but not limited to JScript. DOM supports navigation in any direction. That is, DOM supports navigation from a child to its parent, from a parent to its child and from a child to a previous sibling. Computer 103 may also include a web server component (e.g., a web framework, including server-side mapping modules) (not shown) as described above with respect to computer 102. Computer 102 and computer 103 can be connected via a network 114.

A browser 118 can send an HTTP request to a web server computer such as web server computer 102. The HTTP request can be a request for a page of a web site. The HTML file that is requested can be an annotated HTML file as described herein. Metadata can be sent separately or can be embedded within the annotated HTML file. Additional metadata can be provided that eliminates the need for annotations within the HTML file. In response to receiving the HTTP request, a server module 108 on web server computer 102 can generate an annotated HTML file in which metadata mapping each output element in the fetched file to a corresponding location in a source file is injected. The annotated HTML file can be sent to the client computer 103. Client module(s) 116 can receive the annotated HTML file, (e.g., fetched file 128), can strip out any included metadata and/or annotations, can build a mapping table 138 from the metadata, and can generate a file for the browser without the metadata in it. The file generated from the fetched file which the browser uses to derive and display a web page is called the dynamic browser file 130. Alternatively, metadata can be sent separately. In response to receiving the HTTP request, a server module 108 on web server computer 102 can generate an HTML file and a metadata file in which metadata mapping each output element in the fetched file to a corresponding location in a source file is provided. The HTML file and the metadata file can be sent to the client computer 103. Client module(s) 116 can receive the HTML file, (e.g., fetched file 128) and the metadata file. Mapping module 136 can build a mapping table 138 from the metadata, and can provide the HTML file to the browser. Mapping module 136 can map between the dynamic browser file 130 and the source file 126 using the mapping table 138, by matching identifiers as described more fully above. Browser 118 can concurrently display adjacent to the browser display a source code file (e.g., source file 126 in a source code editor (e.g., source code editor 119)) for the page that is being displayed in the browser 118 based on information in the mapping table 138.

Figure 2:
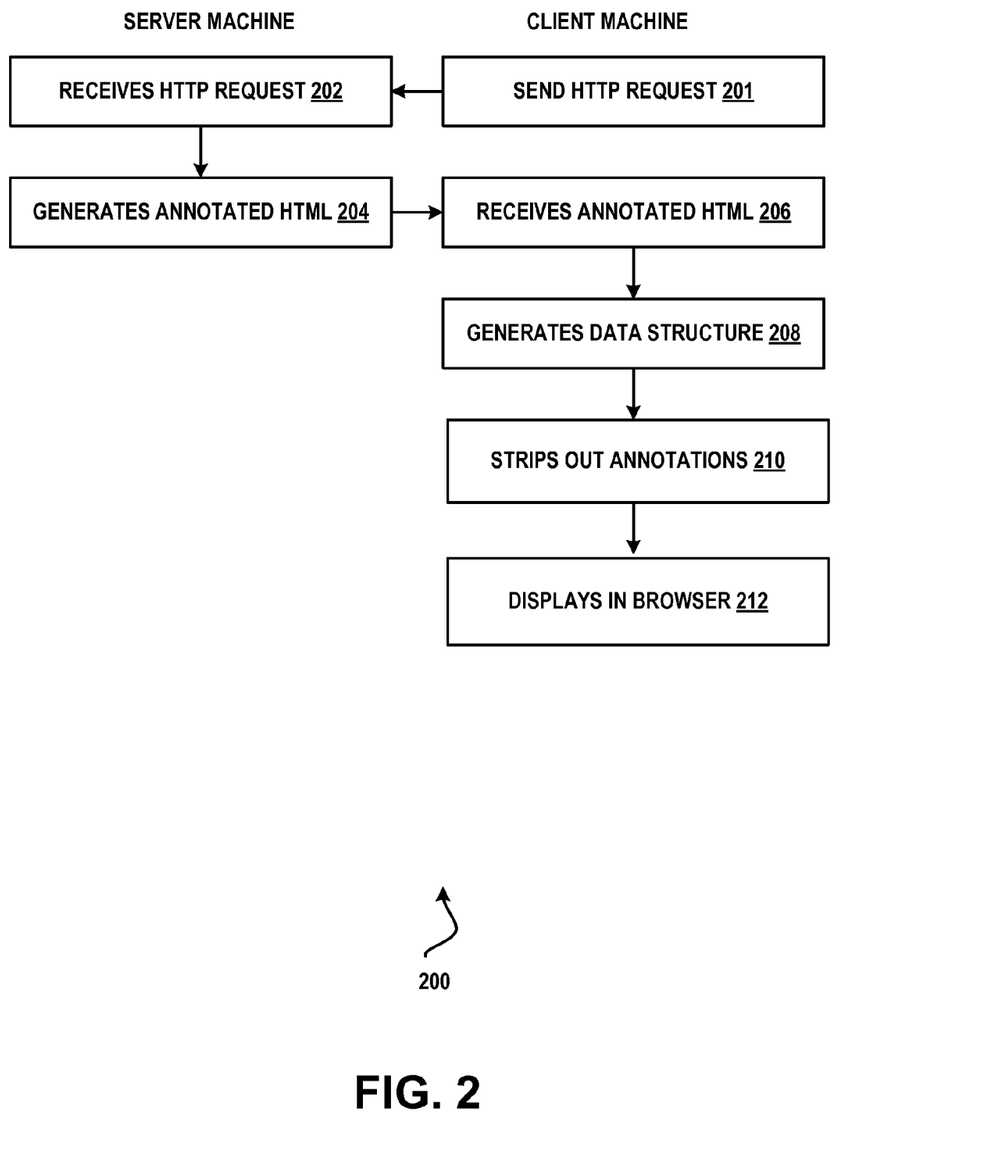
FIG. 2 illustrates an example of a method that maps between fetched and source files in accordance with aspects of the subject matter disclosed herein.

FIG. 2 illustrates an example of a method 200 for mapping between browser and source code files in accordance with aspects of the subject matter disclosed herein. The method described in FIG. 2 can be practiced by a system such as but not limited to the one described with respect to FIG. 1. Some of the actions described below can be optional. Some of the actions described below can be executed in a sequence that differs from that described below. At 201 a browser can send an HTTP request to a web server such as web server computer 102 requesting a particular web page. At 202 the web server running server-side browser modules can receive the HTTP request and in response at 204 can generate a response comprising an HTML file and mapping metadata. The generated HTML file, in accordance with some aspects of the subject matter described herein, may include annotations that delimit location ranges of each output element in the HTML file. The web server computer can generate a metadata comprising a mapping table that includes the context data for each annotated element in the HTML file. The web server can send the annotated HTML file and the metadata to the client. At 206 the client file can receive the annotated HTML file and the metadata. The metadata can be embedded in the HTML or can be sent separately. At 208 the metadata can be used to generate a data structure that can be used to map between fetched and source code files and between source and fetched files. At 210 the annotations can be stripped out of the HTML file and the resulting dynamic browser file can be passed to the browser for display at 212.

Example of a Suitable Computing Environment

Figure 3:
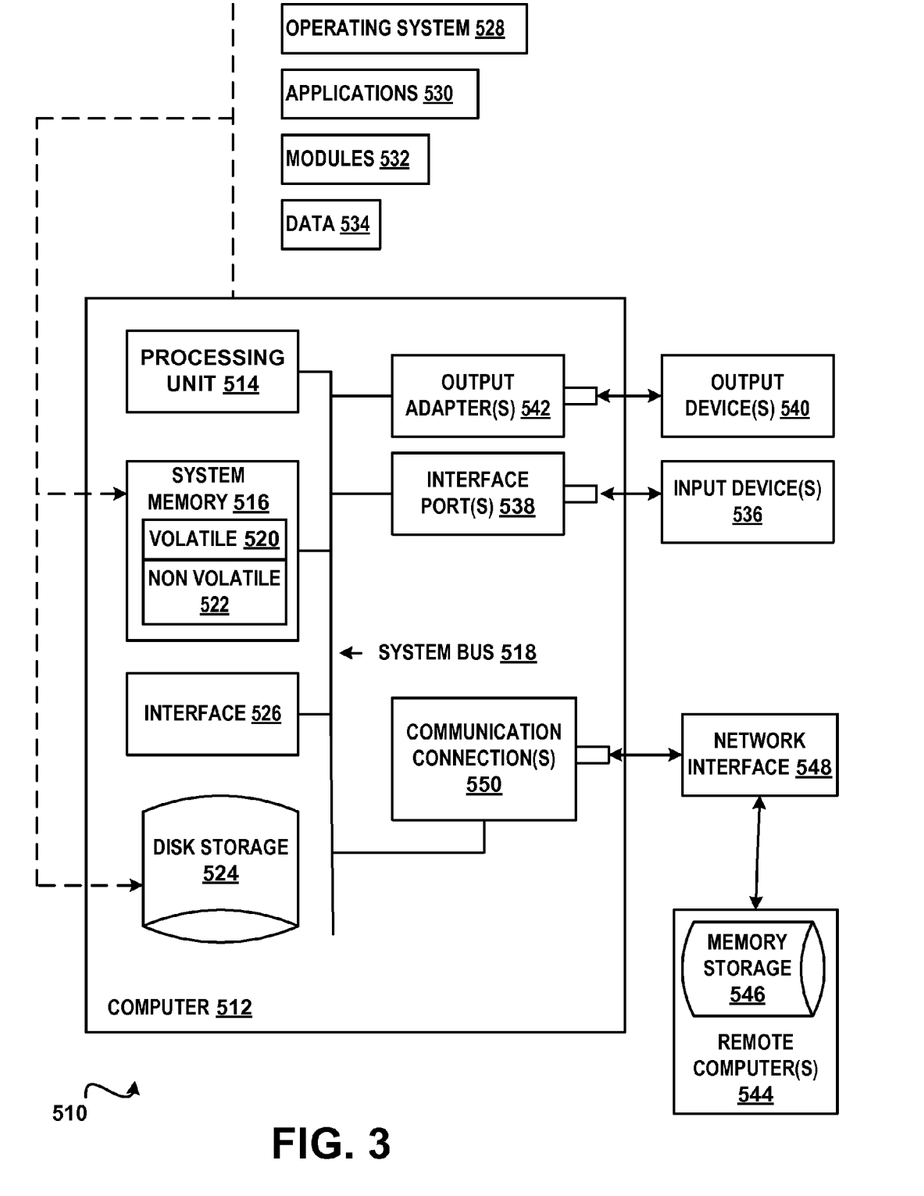
FIG. 3 is a block diagram of an example of a computing environment in accordance with aspects of the subject matter disclosed herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include a processing unit 514, a system memory 516, and a system bus 518. The processing unit 514 can be any of various available processors. Dual microprocessors and other multiprocessor architectures also can be employed as the processing unit 514. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures.

Computer 512 typically includes a variety of computer readable media such as volatile and nonvolatile media, removable and non-removable media. Computer storage media may be implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other transitory or non-transitory medium which can be used to store the desired information and which can be accessed by computer 512.

It will be appreciated that FIG. 3 describes software that can act as an intermediary between users and computer resources. This software may include an operating system 528 which can be stored on disk storage 524, and which can allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection(s) 550. Network interface 548 encompasses communication networks such as local area networks (LANs) and wide area networks (WANs) but may also include other networks. Communication connection(s) 550 refers to the hardware/software employed to connect the network interface 548 to the bus 518. Communication connection(s) 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
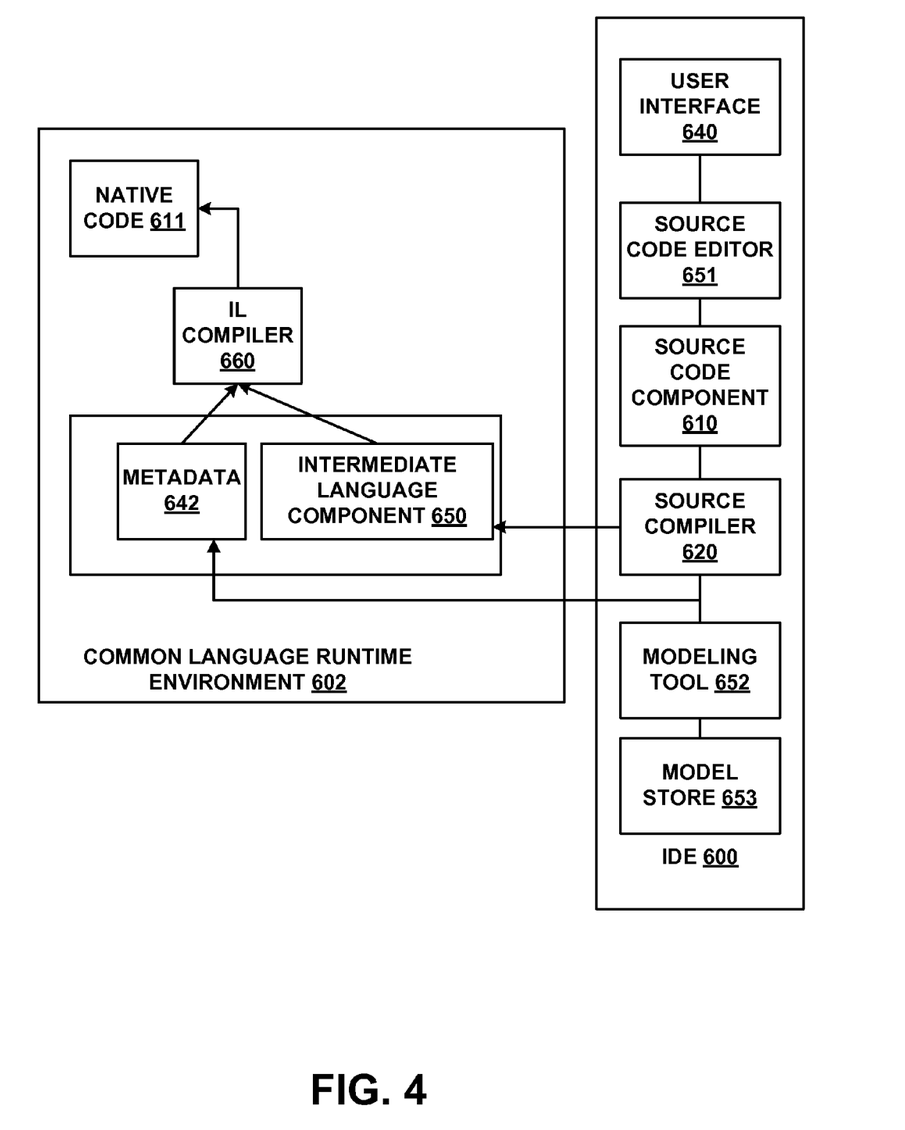
FIG. 4 is a block diagram of an example of an integrated development environment in accordance with aspects of the subject matter disclosed herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++. C#, J#, Java Script, APL, COBOL, Pascal, Eiffel, Haskell, ML, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the .NET framework. An intermediate language component 650 may be created from the source code component 610 and the native code component 611 using a language specific source compiler 620 and the native code component 611 (e.g., machine executable instructions) is created from the intermediate language component 650 using the intermediate language compiler 660 (e.g. just-in-time (JIT) compiler), when the application is executed. That is, when an IL application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable storage medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
   at least one processor of a computing device comprising a web server;
   a memory of the computing device; and
   at least one module loaded into the memory causing the at least one processor to:
   in response to receiving an HyperText Transfer Protocol (HTTP) request for an HyperText Markup Language (HTML) file,
   compile at least one source file to generate the HTML file, the HTML file including a plurality of output elements, the source file having at least one of literal content and non-literal content,
   generate metadata mapping for at least one output element of the plurality of output elements in the HTML file to a particular location in a particular source file responsible for generating the at least one output element, the metadata for the at least one output element of the plurality of output elements comprising a path to the particular source file and a start position in the particular source file at which the code that generates the at least one output element is found, and
   generate an HTTP response including the requested HTML file, the requested HTML file including the metadata, the metadata used by a device initiating the HTTP request to map the at least one output element of the plurality of output elements in the requested HTML file to source code in the particular source file responsible for generating the at least one output element.

2. The system of claim 1, wherein the at least one module generates an annotated HTML file, wherein annotations in the annotated HTML file delimit sections of the HTML in the annotated HTML file.

3. The system of claim 1, wherein the metadata provides additional information associated with the start position and an end position of the at least one output element.

4. The system of claim 1, wherein the metadata for the at least one output element comprises an indicator that signifies that data in the particular source file is literally identical to data in the HTML file.

5. The system of claim 1, wherein the metadata for the at least one output element comprises an indicator that signifies that data in the particular source file is not literally identical to the data in the HTML file.

6. The system of claim 1, wherein a web framework generates the metadata.

7. The system of claim 1, wherein the metadata for the at least one output element comprises an end position or a length of the output element.

8. A method comprising:
   receiving from a web server, in response to a HyperText Transfer Protocol (HTTP) request for an HTML file, by a module executing on a processor of a software development computer comprising a client, metadata comprising mapping data for at least one output element in an annotated HyperText Media Language (HTML) file to a corresponding location in a source file generating the at least one output element, the source file having at least one of literal content and non-literal content;
   generating a mapping table that maps the at least one output element in the annotated HTML to the corresponding location in the source file from which the at least one output element in the annotated HTML was generated; and displaying source code that generated the at least one output element using the mapping table, wherein the source code resides in the source file on the software development computer.

9. The method of claim 8, further comprising:

mapping particular character position in a source file to particular character position in the annotated HTML file.

10. The method of claim 8, further comprising:

removing the metadata and annotations from the annotated HTML file to create a dynamic browser file for a browser.

11. The method of claim 10, comprising:

wherein an Integrated Development Environment (IDE) comprising the browser and a source code editor displays concurrently a web page derived from the dynamic browser file and corresponding source code for a selection in the browser.

12. The method of claim 11, wherein a pair of start and end tokens are identified by a unique identifier.

13. The method of claim 12, wherein the mapping table is created by mapping matching start and end tokens identified by the unique identifier to enable mapping between locations in the HTML file and locations in a particular source file from which an HTML output element was generated, by matching unique identifiers.

14. The method of claim 10, wherein one location in the source file maps to multiple location ranges in the dynamic browser file.

15. A computing device, comprising:

at least one processor and a memory; the memory including at least one module configured to:

receive an annotated HyperText Media Language (HTML) file in response to a request for an HTML file, the annotated HTML file comprising metadata for use in mapping an element in the HTML file to a corresponding location in a source file generating the element, wherein the metadata comprises a path to the source file and a start position for the code generating the element in the source file, the source file having at least one of literal content and non-literal content;

generate a mapping table that maps the element in the annotated HTML file to the corresponding location in the source file from which the element in the annotated HTML file was generated; and display source code that generated the element using the mapping table, wherein the source file resides in the computing device.

16. The computing device of claim 15, wherein the at least one module is further configured to:

map character position in a source file to character position in a dynamic browser file created by removing annotations from the annotated HTML file.

17. The computing device of claim 16, wherein the at least one module is further configured to:

map a single location in the dynamic browser file to multiple source files.

18. The computing device of claim 15, wherein the at least one module is further configured to:

map one location in a source file to multiple location ranges in the dynamic browser file.

19. The computing device of claim 15, wherein the at least one module is further configured to:

display a selection in a browser and concurrently in a source code editor display a corresponding location in a source file that generated the selection displayed in the browser.

20. The computing device of claim 15, wherein the at least one module is further configured to:

map between source code and dynamic browser file by matching unique identifiers.

* * * * *